United States Patent
Sullivan et al.

(10) Patent No.: US 12,411,871 B1
(45) Date of Patent: Sep. 9, 2025

(54) APPARATUS AND METHOD FOR GENERATING AN AUTOMATED OUTPUT AS A FUNCTION OF AN ATTRIBUTE DATUM AND KEY DATUMS

(71) Applicant: Hammel Companies, Inc., Pittsburgh, PA (US)

(72) Inventors: Scott R. Sullivan, Pittsburgh, PA (US); David Dean Yunger, Bellevue, WA (US)

(73) Assignee: Hammel Companies, Inc., Pittsburgh, PA (US)

( * ) Notice: Subject to any disclaimer, the term of this patent is extended or adjusted under 35 U.S.C. 154(b) by 0 days.

(21) Appl. No.: 19/077,149

(22) Filed: Mar. 12, 2025

(51) Int. Cl.
*G06F 16/00* (2019.01)
*G06F 16/28* (2019.01)

(52) U.S. Cl.
CPC ................... *G06F 16/285* (2019.01)

(58) Field of Classification Search
CPC .................................................... G06F 16/285
USPC ......................................................... 707/739
See application file for complete search history.

(56) References Cited

U.S. PATENT DOCUMENTS

| | | | |
|---|---|---|---|
| 9,846,902 | B2 | 12/2017 | Brady et al. |
| 10,657,158 | B2 | 5/2020 | Sheng et al. |
| 10,776,717 | B2 | 9/2020 | Ghatage et al. |
| 12,274,503 | B1 * | 4/2025 | Peri .................. G06T 7/0012 707/707 |
| 2023/0230021 | A1 | 7/2023 | Betancur |
| 2023/0245651 | A1 * | 8/2023 | Wang ................. G06N 5/022 704/275 |
| 2024/0202221 | A1 * | 6/2024 | Siebel ............... G06F 16/3347 707/707 |
| 2025/0095008 | A1 * | 3/2025 | Moghaddam ...... G06Q 30/0203 707/707 |
| 2025/0190475 | A1 * | 6/2025 | Siebel ............... G06F 16/3326 707/707 |

FOREIGN PATENT DOCUMENTS

TW 202414306 A 4/2024

OTHER PUBLICATIONS

C.H. Robinson adds AI-powered reply technology to emailed quote requests May 7, 2024—General News, Press Release https://www.producebluebook.com/2024/05/07/c-h-robinson-adds-ai-powered-reply-technology-to-emailed-quote-requests/.

* cited by examiner

*Primary Examiner* — Alexandria Y Bromell
(74) *Attorney, Agent, or Firm* — Caldwell Intellectual Property Law

(57) ABSTRACT

An apparatus and method for generating an automated output as a function of an attribute datum and key datums. The apparatus includes at least a processor and a memory communicatively connected to the at least a processor. The memory instructs the processor to receive a first datum comprising a plurality of unstructured data, classify, using a classifier, the first datum based on an attribute datum, identify, using a key datum extractor, key datums as a function of the attribute datum, generate, using a validation model, an output as a function of the attribute datum and the key datums, and transmit the output to a downstream system.

16 Claims, 10 Drawing Sheets

APPARATUS AND METHOD FOR GENERATING AN AUTOMATED OUTPUT AS A FUNCTION OF AN ATTRIBUTE DATUM AND KEY DATUMS

FIELD OF THE INVENTION

The present invention generally relates to the field of machine learning. In particular, the present invention is directed to an apparatus and a method for generating an automated output as a function of an attribute datum and key datums.

BACKGROUND

In today's fast-paced digital landscape, organizations receive a high volume of electronic communications, including emails, that contain critical information requiring timely responses and appropriate handling. However, manual processing of such high volumes of unstructured data is both labor-intensive and prone to errors, which may lead to inefficiencies, missed deadlines, and unsatisfactory experiences. While certain rule-based systems exist to automate aspects of email categorization and response, these systems often lack flexibility and adaptability, particularly when handling diverse and dynamic email content.

SUMMARY OF THE DISCLOSURE

In an aspect, an apparatus for generating an automated output as a function of an attribute datum and key datums includes at least a processor and a memory communicatively connected to the at least a processor. The memory contains instructions configuring the processor to receive a first datum comprising a plurality of unstructured data, classify, using a classifier, the first datum based on an attribute datum, identify, using a key datum extractor, key datums as a function of the attribute datum, generate, using a validation model, an output as a function of the attribute datum and the key datums, and transmit the output to a downstream system.

In another aspect, a method for generating an automated output as a function of an attribute datum and key datums includes receiving, using at least a processor, a first datum comprising a plurality of unstructured data, classifying, using a classifier, the first datum based on an attribute datum, identifying, using a key datum extractor, key datums as a function of the attribute datum, generating, using a validation model, an output as a function of the attribute datum and the key datums, and transmitting, using the at least a processor, the output to a downstream system.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for generating an automated output as a function of an attribute datum and key datums. The apparatus includes at least a computing device comprised of a processor and a memory communicatively connected to the processor. The memory instructs the processor to receive a first datum comprising a plurality of unstructured data. The processor classifies, using a classifier, the first datum based on an attribute datum. The processor identifies, using a key datum extractor, key datums as a function of the attribute datum. Additionally, the processor generates, using a validation model, an output as a function of the attribute datum and the key datums. The memory then instructs the processor to transmit the output to a downstream system.

Figure 1:
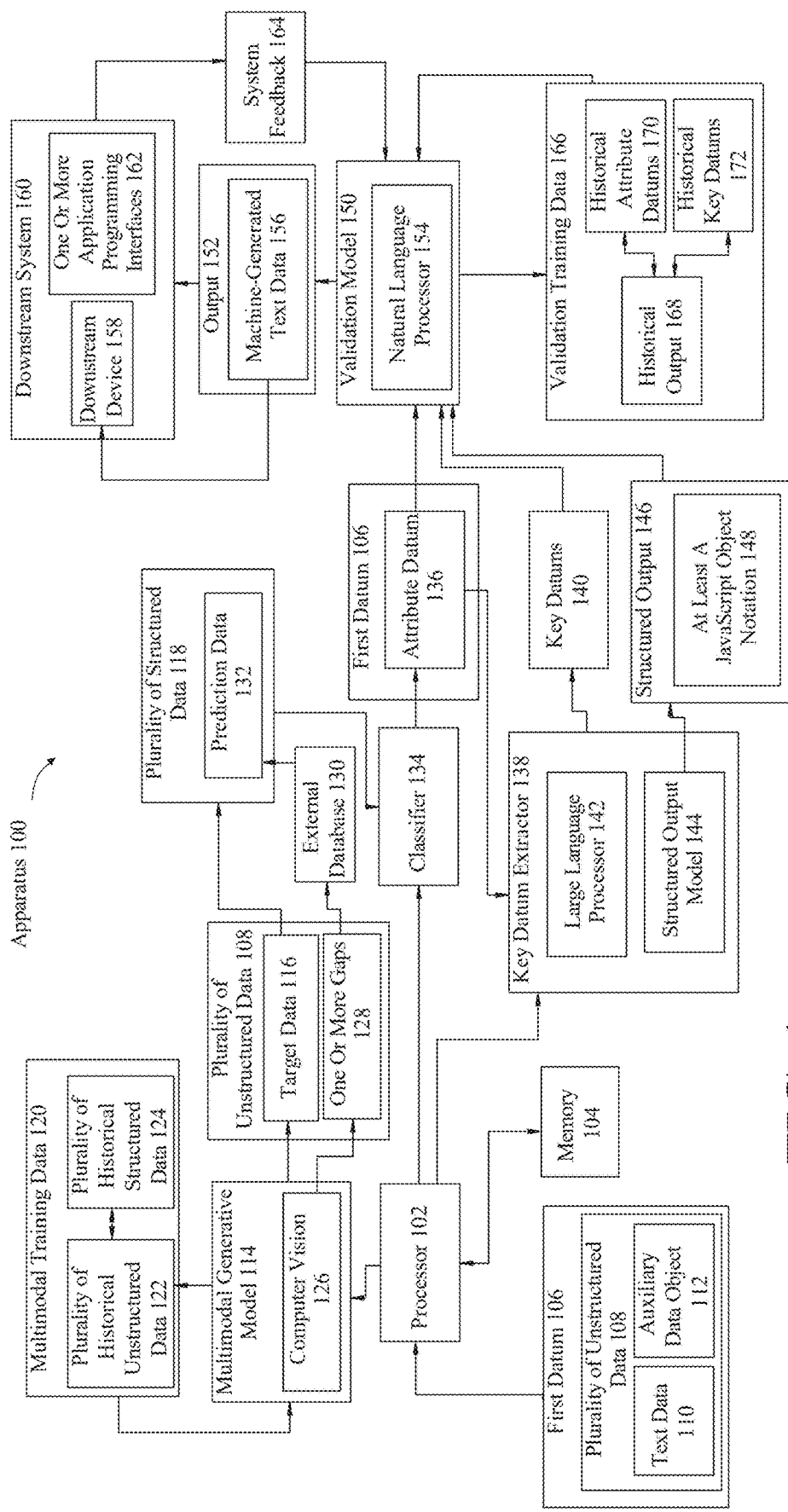
FIG. 1 is a block diagram of an apparatus for generating an automated output as a function of an attribute datum and key datums.

Referring now to FIG. 1, an exemplary embodiment of apparatus 100 for generating an automated output as a function of an attribute datum and key datums is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communication connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to receive a first datum 106 comprising a plurality of unstructured data 108. As used in this disclosure, a "first datum" is an initial data input received by the processor 102. In a non-limiting example, the first datum 106 may include a set of information elements, specifically a collection of unstructured data points. Continuing, the first datum 106 may serve as the primary input for processing within the system, where subsequent actions and analyses will occur based on its content. Without limitation, the first datum 106 may include a customer email. For instance, the first datum 106 may include unstructured text with variable content, layout, and language. Continuing, the first datum 106 may contain various types of information, such as customer inquiries, requests, or feedback, that the apparatus may interpret and classify. Continuing, the first datum 106, as this primary input, may set the stage for the system to analyze, categorize, and respond appropriately to the customer's needs based on the extracted information elements, guiding further processing steps within the apparatus.

With continued reference to FIG. 1, as used in this disclosure, "unstructured data" is information that does not have a predefined data model or organized structure. In a non-limiting example, unstructured data 108 may be challenging to analyze using traditional, rule-based or statistical approaches. In a non-limiting example, unstructured data 108 may include emails, text documents, images, and/or other content formats that lack a rigid structure. Without limitation, the unstructured data 108 may include diverse information found in emails, messages, or similar communication content, which the apparatus may interpret, classify, and process using artificial intelligence (AI) and machine learning techniques.

With continued reference to FIG. 1, in a non-limiting example, the first datum 106 may be an email from a customer reaching out to a support team with an inquiry. Continuing, The email may contain various unstructured data points, such as: Sender Information: "From: jane.doe@example.com," Subject Line: "Issue with recent order #12345," Message Body: "Hello, I recently placed an order (#12345) but noticed that my shipping address was incorrect. Could you please help me update the address to 456 New Street, Springfield? Thank you!" Continuing, in this non-limiting example, the first datum 106 includes the entire content of the email, including the sender's address, the subject line, and the message body. Without limitation, this information may be processed by the apparatus to extract key information, such as the order number, the request to update an address, and the new address details.

Continuing, the extracted information may then guide further actions, such as categorizing the email as a "shipping request" or forwarding it to a representative for address update verification as discussed in more detail herein.

With continued reference to FIG. 1, plurality of unstructured data 108 may include one or more of text data 110 and an auxiliary data object 112. As used in this disclosure, "text data" is any unstructured or semi-structured sequence of characters that conveys information in written form. In a non-limiting example, text data 110 may include content such as email messages, chat logs, descriptions, notes, and/or other forms of narrative text. Without limitation, text data 110 may include letters, numbers, punctuation, and/or spaces arranged in a natural language format to communicate information. In a non-limiting example, text data 110 may include the body of an email sent by a customer requesting support. For instance, without limitation, "Hello, I am experiencing issues with my recent order #56789.The product arrived damaged. Could you please provide instructions on how to return it?" Continuing the previous non-limiting example, the text data 110 includes the customer's message in natural language, containing words, numbers, and punctuation. Continuing, the text data 110 may be analyzed to determine the intent (requesting return instructions) and key information (order number, issue description) for processing as described further below.

With continued reference to FIG. 1, as used in this disclosure, an "auxiliary data object" is a supplementary piece of information or data structure associated with the primary text data 110. Without limitation, an auxiliary data object 112 may provide additional context, metadata, or support to enhance the understanding or processing of the text data 110. For example, without limitation, the auxiliary data object 112 may include attachments (such as images, PDF files, voice memos), timestamps, location data, user IDs, file links, and/or other non-text elements that aid in interpreting or categorizing the primary text data 110. In a non-limiting example, the auxiliary data object 112 may be a file attachment included in the same customer email, such as a photograph of the damaged product. Other examples may include: a timestamp: "2023-10-01T14: 32:00Z," indicating the date and time the email was sent, a customer ID: "12345ABC," uniquely identifying the customer within the system, location data: "123 Main St, Springfield," showing the customer's address, possibly extracted from email metadata, and the like.

With continued reference to FIG. 1, the apparatus further may include a multimodal generative model 114 configured to receive plurality of unstructured data 108, process plurality of unstructured data 108, wherein processing plurality of unstructured data 108 comprises extracting target data 116, and output a plurality of structured data 118. As used in this disclosure, a "multimodal generative model" is a machine learning model capable of processing and synthesizing information from multiple types or "modes" of input data. In a non-limiting example, the multimodal generative model 114 is configured to receive a plurality of unstructured data 108, including various data formats that may lack predefined structure, and perform processing tasks that involve identifying and extracting target data 116 relevant to the generate the plurality of structured data 118. Without limitation, the multimodal generative model 114 may involve analyzing the unstructured data 108, identifying patterns or key elements (referred to as target data 116), and generating an organized output, such as the plurality of structured data 118. As used in this disclosure, "target data" is the relevant information extracted from unstructured data 108 that is necessary to convert the unstructured data 108 into structured data 118. Without limitation, target data 116 may include specific details or attributes identified within the plurality of unstructured data 108 that may be organized into a defined format or schema, enabling the transformation from an unstructured state to structured, accessible, and analyzable data. For instance, without limitation, in an email processing system, the target data 116 may include essential elements such as names, dates, order numbers, or issue descriptions. Continuing, extracting the target data 116 allows the system to populate structured fields, thus facilitating further processing and analysis. As used in this disclosure, "structured data" is information that is organized into a defined format or schema. In a non-limiting example, the plurality of structured data 118 may allow for easy storage, retrieval, and analysis. Continuing, the plurality of structured data 118 may be arranged in a predictable and standardized way, such as in rows and columns (e.g., in databases or spreadsheets) or in structured formats like JavaScript object notation 148 (JSON), Extensible Markup Language (XML), Comma-Separated Values (CSV), and the like.

With continued reference to FIG. 1, the multimodal generative model 114 may be trained on multimodal training data 120 comprising a plurality of historical unstructured data 122 108 corresponding to a plurality of historical structured data 124. As used in this disclosure, "multimodal training data" is a dataset used to train the multimodal generative model 114. In a non-limiting example, the multimodal training data 120 may include various types or "modes" of data, such as text, images, audio, or other data formats. Continuing, the multimodal training data 120 may include both unstructured and structured formats, enabling the model to learn from multiple data sources and adapt to interpreting and transforming different types of input data.

As used in this disclosure, "historical unstructured data" is past data that lacks a predefined format or organization and has not been processed into a structured form. Without limitation, the historical unstructured data may include previous emails, documents, images, or other raw information that the apparatus may have encountered in real-world usage. Without limitation, the historical unstructured data may provide examples for the multimodal generative model 114 to learn how to interpret and extract relevant information from complex, unformatted content. As used in this disclosure, "historical structured data" is past data that has been organized into a predefined format or schema. In a non-limiting example, historical structured data may include predefined format data from databases, tables, or standardized files like JSON, XML, CSV, and the like. Without limitation, the historical structured data may serve as the reference or target format in training, showing the multimodal generative model 114 the intended output structure for various types of unstructured input. Continuing, the multimodal generative model 114 may learn how to accurately convert similar unstructured data 108 inputs into the desired structured format using the plurality of historical unstructured data 122 corresponding to the plurality of historical structured data 124.

With continued reference to FIG. 1, the multimodal generative model 114 may include computer vision 126 configured to identify one or more gaps 128 in plurality of unstructured data 108, and fill, using an external database 130, the one or more gaps 128 in plurality of unstructured data 108 with prediction data 132. As used in this disclosure, "computer vision" is a field within artificial intelligence and computer science which enables computers to interpret, process, and make sense of visual data from the world. Without limitation, computer vision 126 may interpret, process, and make sense of images, videos, and other visual inputs. In a non-limiting example, computer vision 126 algorithms and models,ay analyze the visual inputs to identify, classify, and extract relevant information, such as objects, patterns, or movements, in order to generate meaningful insights. As used in this disclosure, a "gap" refer to missing, incomplete, or inconsistent information within a dataset or input. In a non-limiting example, the gap 128 may prevent the first datum 106 from fully meeting specified requirements or expectations. Without limitation, the gap 128 may represent areas where relevant data or components are absent or fail to align with a predefined standard, such as missing parts in an image, unpopulated fields in a data set, or deviations from a reference model. In a non-limiting example, gap 128 data may include the missing data that hinders converting unstructured data 108 into structured data 118. For instance, without limitation, the apparatus may be designed to extract structured information from first attribute, or customer emails. Continuing, the structured format requires specific fields, such as Customer ID, Order Number, Issue Description, Resolution Requested, and the like. Without limitation, if the unstructured data 108 includes a customer email saying, "Hi there, I received my order, and one of the items is defective. Can someone please assist me with this issue?" there are gaps 128 in the data that is needed to properly structure the information. For instance, the customer email does not provide an identifier to link it with a specific customer. Continuing, the customer email does not provide an order number, without the order number, it is unclear which order the customer is referring to. Without limitation, the customer email does not provide a resolution requested, although the customer mentions a defective item, the email does not specify what the customer wants such as, a replacement, a refund, and the like. Therefore, the gaps 128 may prevent the apparatus from populating the structured fields completely, as critical information needed for organization and response is absent. Without limitation, the apparatus may need these gaps filled, either through follow-up or prediction data 132, to accurately convert the unstructured email text into structured data 118.

With continued reference to FIG. 1, as used in this disclosure, "prediction data" is information generated by a model or system as an anticipated outcome based on analyzing input data and applying learned patterns or rules. Without limitation, the prediction data 132 may include a forecast or estimated value derived from various attributes of the input data, aiming to provide insights or guide decision-making. For example, the multimodal generative model 114 may generate a plurality of structure data from the plurality of unstructured data 108 contained in the first datum 106, or a customer email. Continuing, the prediction data 132 may include identifying the likelihood of the customer's intent (such as requesting a refund or reporting a complaint) based on the language and keywords used. Continuing, the predicted intent may help to direct the email to the appropriate department or response protocol as discussed in more detail below. As used in this disclosure, an "external database" is a database that exists outside the application but may be accessed by the apparatus to retrieve, store, and/or update information as needed. Without limitation, the external database 130 may be hosted on a different server, within a different organization, or in the cloud, and may be accessed via secure connections and standardized protocols, such as APIs (Application Programming Interfaces 162) or database connectors.

With continued reference to FIG. 1, in a non-limiting example, the apparatus may use the external database 130 to fill in gap 128 (or missing information) with the prediction data 132 when processing the unstructured data 108 (a customer email). For instance, when the apparatus receives the unstructured data 108, such as an email from a customer, where the email requests assistance with an order but lacks specific details like the order number or customer ID, the apparatus may identify the gaps 128 and access the external database 130 containing relevant customer and order records. Continuing, the apparatus may use the available information in the email, such as the sender's email address or name and the apparatus may query the external database 130 to predict likely matches. For instance, the apparatus may predict the most recent order associated with the customer's email as the relevant order and identify the customer ID based on a unique match found in the external database 130 records. Continuing, the apparatus may then fill in the gaps 128 with prediction data 132, assigning values for order number and customer ID in the structured data 118, allowing the apparatus to proceed with processing the support request without requiring further information from the customer. Continuing, this approach may streamline interactions by reducing response times and potentially improving accuracy. To improve extraction metrics, various methods may be introduced to enhance extraction scores. As used in this disclosure, an "extraction score" is a quantitative measure reflecting the accuracy and completeness of data extracted from unstructured or structured sources by a data extraction model. Continuing, the extraction score may be based on factors such as the percentage of correctly identified data points, accuracy in categorizing information, and completeness in capturing relevant data fields, and it may be used to assess and optimize the extraction model's performance. Without limitation, these methods may include reviewing data capture errors, gathering feedback on larger sample sizes, improving data parsing techniques, testing alternative tools, utilizing ChatGPT-4 turbo and ChatGPT-4-o text and visual engines, and incorporating validators for out-of-range output results. In a non-limiting example, upon implementing these improvements, data performance metrics indicate a data capture success rate of approximately 95%, with the automation factor for BoL files containing all required data increasing from 30% to 70%. As used in this disclosure, a "BoL file" is a document or digital record containing a Bill of Lading. In a non-limiting example, the BoL file may include a detailed list issued by a carrier to acknowledge receipt of cargo for shipment. Continuing, the BoL file may include essential information such as the shipper's and receiver's details, item descriptions, quantities, weights, handling instructions, tracking details, and the like. Without limitation, BoL files are used to extract and structure this information for logistics, tracking, and compliance purposes.

With continued reference to FIG. 1, in some embodiments, the computer vision 126 may include an optical character recognition or optical character reader (OCR) which includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

With continued reference to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

With continued reference to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 5-7.

With continued reference to FIG. 1, the OCR may include post-processing. Without limitation, the OCR may enhance accuracy by post-processing. For example, without limitation, the accuracy may be improved by using a lexicon to constrain the output. In a non-limiting example, a lexicon may include a predefined set of terms relevant to a particular application. For instance, without limitation, the lexicon may include medical terms specific to a field of medicine or legal jargon for a legal contract. Without limitation, the OCR output may include a plain text stream or a structured data fil. In a non-limiting example, the OCR may preserve the original layout, including, without limitation, headers, footers, and/or paragraph structure.

With continued reference to FIG. 1, a near-neighbor analysis may correct errors based on common word pairings. Continuing, the near-neighbor analysis may recognize frequent co-occurrence, such as, "lion and tiger" is generally more common than, "lion and tighter," allowing the OCR to choose the correct phrase. Additionally and or alternatively, the OCR may process may incorporate grammatical rules of the language being analyzed. For instance, the OCR process may incorporate verb-noun rules. Continuing, the verb-noun rules may assist in identifying sentence structure, enhancing output accuracy. For instance, without limitation, in a sentence like "The eagle flies," the OCR system can use grammatical rules to identify "eagle" as the noun and "flies" as the verb, helping it accurately interpret the phrase rather than misreading "flies" as a noun, which could imply insects. Without limitation, the OCR process may utilize distance measurement techniques, such as the Damerau-Levenshtein distance algorithm. Continuing, the Damerau-Levenshtein distance algorithm may be applied in post-processing to further refine recognition by correcting closely related misspellings and typos. Without limitation, the Damerau-Levenshtein distance algorithm may include a string-matching algorithm that calculates the minimum number of operations required to transform one string into another. Without limitation, it is an extension of the Levenshtein distance algorithm, which allows for four types of operations: insertion, deletion, substitution, and transposition (switching adjacent characters), where each operation counts as one "distance" unit. For example, to convert "cart" to "cat," the Damerau-Levenshtein distance would be 1 (a deletion of "r"). To convert "form" to "from," the distance would also be 1 (a transposition of "o" and "r").

Still referring to FIG. 1, processor 102 is configured to classify, using a classifier 134, the first datum 106 based on an attribute datum 136. As used in this disclosure, an "attribute datum" is a specific piece of information or characteristic extracted from a larger dataset or input. In a non-limiting example, the attribute datum 136 may serve as a key characteristic that helps define or categorize the first datum 106 by identifying a relevant feature within it. For instance, without limitation, the attribute datum 136 may be the type of request in a customer support email, such as "billing inquiry" or "technical issue." Continuing, the classifier 134 may analyze the attribute datum 136 within the first datum 106 to determine an appropriate category or class. Examples of classes may include a billing inquiry, an order status, technical support, account update, product information, return/exchange request, complaint, feedback or suggestion, pickup scheduling, cancellation request, route change request, lost item report, service availability inquiry, special accommodation requests, driver information request, delivery confirmation requests, estimated time of arrival requests, weather delay inquiry, insurance coverage inquiry, cargo damage claims, and the like. In a non-limiting example, the attribute datum 136 related to a billing inquiry might include a customer requesting clarification on specific charges within their invoice or adjustments for perceived overcharges. In a non-limiting example, the attribute datum 136 related to an order status request may involve a customer checking the progress of a shipment or asking about an expected delivery date. In a non-limiting example, the attribute datum 136 related to a technical support request may come from customers needing help with the service platform, such as troubleshooting booking issues on the app. In a non-limiting example, the attribute datum 136 related to an account update request may be a customer asking to update their contact details or payment method within their transportation account. In a non-limiting example, the attribute datum 136 related to product information requests may include customers seeking details about different transportation options, service types, or available routes. In a non-limiting example, the attribute datum 136 related to return/exchange requests may involve rescheduling a trip or modifying shipment details due to unforeseen circumstances. In a non-limiting example, the attribute datum 136 related to a complaint may include information regarding issues such as delays, vehicle cleanliness, or dissatisfaction with the driver. In a non-limiting example, the attribute datum 136 related to feedback or suggestions may include customers providing ideas for improving app functionality or requesting new service features. In a non-limiting example, the attribute datum 136 related to pick up scheduling, a customer may request to confirm or change a previously set pickup time and location. In a non-limiting example, the attribute datum 136 related to cancellation requests may arise if a customer needs to cancel an upcoming ride or delivery. In a non-limiting example, the attribute datum 136 related to a route change request could be a customer needing to adjust the delivery or trip destination. In a non-limiting example, the attribute datum 136 related to a lost item report, a passenger may notify the service of an item left in the vehicle. In a non-limiting example, the attribute datum 136 related to a service availability inquiry may include questions about whether transportation is offered in specific areas or at particular times. In a non-limiting example, the attribute datum 136 related to special accommodations may involve a customer asking for wheelchair access, extra space for cargo, or a specific vehicle model. In a non-limiting example, the attribute datum 136 related to driver information requests may entail customers asking for contact details or driver verification, and delivery confirmation requests could involve customers needing proof that a shipment reached its destination. In a non-limiting example, the attribute datum 136 related to an estimated time of arrival (ETA) requests allow customers to check when a pickup or delivery is expected to arrive. In a non-limiting example, the attribute datum 136 related to weather delay inquiries, customers may ask how anticipated weather conditions could impact their transportation plans. In a non-limiting example, the attribute datum 136 related to insurance coverage inquiries may involve customers asking about insurance policies covering their shipment. Lastly, cargo damage claims may occur if goods are damaged during transit, with customers requesting compensation or insurance claims processing. Continuing, this process enables the system to handle incoming data by grouping similar types of requests or customer communications, streamlining organization and response actions.

With continued reference to FIG. 1, in a non-limiting example, if the first datum 106 contains an email mentioning a refund request, the attribute datum 136, such as request type, may be extracted as "refund," allowing the classifier 134 to categorize the email accordingly and route it to the appropriate support team. Continuing, the classification may help ensure efficient, relevant handling of data across various types of customer inquiries. In another non-limiting example, if the first datum 106 contains an email that references a pickup scheduling request, the attribute datum 136 may be identified as "pickup scheduling." For instance, if a customer emails stating, "Hi, I'd like to arrange a pickup for my shipment on Friday morning. Please confirm availability," the classifier 134 may extract the term "pickup scheduling" as the attribute datum 136 related to the request type. Continuing, the attribute datum 136 may allow the classifier 134 to categorize the email as a scheduling inquiry and route it to the appropriate logistics or scheduling team. Continuing, by categorizing the email correctly, the classifier 134 may help ensure the request is addressed promptly, facilitating efficient coordination and communication around pickup logistics, thereby improving response time and service accuracy.

Still referring to FIG. 1, processor 102 is configured to identify, using a key datum extractor 138, key datums 140 as a function of the attribute datum 136. As used in this disclosure, a key datum extractor is a component configured to identify specific pieces of information, termed key datums 140, within an input. Without limitation, the key datum extractor may be configured to analyze the input, such as, first datum 106, structured data 118, unstructured data 108, like an email or customer inquiry, in relation to a given attribute datum 136. Without limitation, the key datum extractor may identify and extract relevant information, such as key datums, associated with pickup requests, including details such as pickup addresses, dates, times, and any additional information needed to complete the pickup request. As used in this disclosure, "key datums" are the required pieces of information to accurately process a request associated with a given attribute datum 136. In a non-limiting example, the key datums 140 may represent specific data points that the apparatus must extract from the structured input or unstructured input, such as an email, to facilitate effective response or action. For example, without limitation, in a pickup scheduling request, the key datums 140 may include details such as the pickup date and time, pickup location, and contact information for confirmation. Continuing, the key datums 140 may be identified based on the attribute datum 136, allowing the system to process the scheduling request correctly by ensuring all necessary information is collected and organized for routing to the appropriate team or automated process.

With continued reference to FIG. 1, without limitation, in a refund request, the key datums 140 may include information such as the order number, reason for the refund, and payment method used. Continuing, the key datums 140 may allow the apparatus to locate the specific transaction, assess eligibility for a refund, and initiate the appropriate reimbursement process. Continuing, identifying key datums 140 ensures the request is handled swiftly and accurately. In another non-limiting example, in an order status inquiry, key datums 140 may include the tracking number or order ID and delivery address. Continuing, by extracting the key datums 140, the apparatus may access real-time tracking information and provide the customer with an accurate update on their order's location and estimated delivery time. In another non-limiting example, in a technical support request, key datums 140 may include the product model or serial number, a description of the issue, and possibly purchase date. Continuing, the key datums 140 may enable the support team to determine warranty status, troubleshoot the specific problem, and suggest solutions tailored to the product and issue. Without limitation, in a billing inquiry, the key datums 140 may include the invoice number, billing period, and customer account number. Continuing, the key datums 140 may help the apparatus locate the correct billing record, verify charges, and address any discrepancies or questions the customer may have regarding their bill. In another non-limiting example, in a special accommodation request related to transportation, key datums 140 may include the type of accommodation needed (e.g., wheelchair access or extra cargo space), pickup location, and vehicle type. Continuing, extracting this information may help ensure that the transportation service can meet the customer's specific needs, arranging the appropriate vehicle and setup. In another non-limiting example, in a lost item report, key datums 140 may include the trip ID, date and time of the trip, and item description. Continuing, this information may assist the apparatus in locating the specific ride and connecting with the driver to recover the lost item, facilitating efficient resolution and communication with the customer.

With continued reference to FIG. 1, the key datum extractor 138 may include a large language model 142. A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, transportation records, and the like. In some embodiments, training sets may include a variety of subject matters, such as customer support requests, product inquiries, transactional updates, scheduling communications, and account management interactions. Additional subject areas may cover billing and payment inquiries, technical support questions, feedback submissions, order tracking requests, and the like. In some embodiments, training sets of an LLM may include information from one or more public or private databases. As a non-limiting example, training sets may include databases associated with an entity. In some embodiments, training sets may include portions of documents associated with the key datums 140 correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "I am feeling", then it may be highly likely that the word "happy" or "sad" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

With continued reference to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

With continued reference to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It's also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data 108. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with first datum 106.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data 108. In some embodiments, textual output may include a phrase or sentence identifying the status of a user query. In some embodiments, textual output may include a sentence or plurality of sentences describing a response to a user query. As a non-limiting example, this may include key datums 140.

With continued reference to FIG. 1, the key datum extractor 138 may include a structured output model 144 configured to generate a structured output 146 may include at least a JavaScript object notation 148. As used in this disclosure, a "structured output model" is a machine learning model designed to accept unstructured data 108 or structured data 118 as input, identify key datums 140, and produce a structured output 146 format based on the key datums 140. In a non-limiting example, the structured output model 144 may be configured to reorganize, filter, or condense input data, such as plurality of unstructured data 108, plurality of structured data 118, and/or first datum 106, extracting only the relevant information needed for a specified task and formatting it according to a target schema. For instance, without limitation, the structured output model 144 may analyze incoming structured data 118, such as tables, records, or JSON objects, and use trained extraction techniques to identify the key datums 140 required. Continuing, the structured output model 144 may generate a structured output 146 that aligns with the required structure, which may involve a different schema or an aggregated, simplified version of the input data. Without limitation, the structured output 146 may enable the structured output model 144 to efficiently transform input data into refined, targeted data outputs that are streamlined for downstream processes or specific applications, such as reporting, data analysis, or automated decision-making. For example, if the input data include an order record with multiple fields, but the output requires only a subset of fields (like "customer ID," "order total," and "delivery status"), the structured output model 144 may selectively extract these fields and format them into a new, simplified structured output 146. Continuing, this approach may ensure that the output aligns with the specified format while pulling only the essential information based on key datums 140, making it useful for applications where data transformation or reorganization is required for efficient processing.

With continued reference to FIG. 1, as used in this disclosure, "JavaScript Object Notation (JSON)" is a lightweight, text-based data interchange format designed to be easy for both humans to read and write and for machines to parse and generate. Without limitation, the JSON may represent data as key-value pairs, which are organized into objects (collections of key-value pairs) and arrays (ordered lists of values), allowing for a highly flexible and hierarchical structure. In a non-limiting example, the JSON may be widely used in web applications and APIs to transmit structured data 118 between a server and a client. Continuing, the JSON may include simple, language-agnostic syntax making it adaptable across programming languages and platforms. Continuing, JSON, may be commonly applied in scenarios that require structured data 118, such as configurations, data storage, and structured outputs 146 from machine learning models.

Still referring to FIG. 1, processor 102 is configured to generate, using a validation model 150, an output 152 as a function of the attribute datum 136 and the key datums 140. As used in this disclosure, a "validation model" is a machine learning or rule-based model configured to analyze both the attribute datum 136 and key datums 140 extracted from input data to generate an output 152 response. Without limitation, the response is tailored to the specific customer request or situation, serving as an actionable or informative response either back to the customer or directed upstream to support personnel. Continuing, the validation model 150 may ensure that the response aligns with business rules or requirements, confirming that all necessary information is present before an output 152 is produced. For example, the validation model 150 may confirm if all required key datums 140 for a "pickup scheduling" request (e.g., pickup location, date, and time) are included. Without limitation, if key information is missing, the validation model 150 may generate an output 152 asking the customer for further details.

With continued reference to FIG. 1, as used in this disclosure, an "output" is a response generated by the apparatus based on the attribute datum 136 and key datums 140 processed by the validation model 150. Without limitation, the output 152 may vary based on the request type and data completeness. In a non-limiting example, if the customer has provided all necessary information for a pickup request, the output 152 may include creating or assigning a pickup (PU) number for confirmation. Alternatively, if key information is missing, the output 152 may include a response email asking the customer to provide additional details. Continuing, the output 152 may be directed as a response to the customer or as a structured update for customer support personnel.

With continued reference to FIG. 1, in a non-limiting example, if key datums 140, or essential information, like the pickup location is missing from a customer's pickup scheduling request, the validation model 150 may produce an output 152 stating, "Please provide the pickup address to confirm your request." This output 152 may direct the customer to supply missing key datums 140, ensuring complete and accurate data for processing. In another non-limiting example, for a completed pickup request where all key datums 140, or necessary information (pickup location, time, and contact details), is provided, the validation model 150 may generate an output 152 that assigns a pickup (PU) number to the customer, such as "Your pickup number is PU12345. Please use this number for any inquiries related to this pickup." In another non-limiting example, if a customer requests an update on an existing order, the validation model 150 may respond with the output 152 that states the current order status, such as, "Your order #12345 is currently in transit and scheduled for delivery on [date]." Continuing, the output 152 may help provide the customer with an accurate update based on the attribute and key datums 140. In another non-limiting example, if the validation model 150 detects attribute datum 136 related to a request requiring specialized attention (e.g., a complaint about a delayed shipment), the validation model 150 may generate an output 152 that escalates the issue upstream to a support team member, such as, "Please review and address the customer's complaint regarding delayed order #12345." Continuing, this type of output 152 may help ensure that critical issues receive appropriate human intervention.

With continued reference to FIG. 1, the validation model 150 may be configured to identify and resolve conflicting key datums 140. For example, without limitation, the validation model may be designed to handle situations where a customer sends multiple emails, such as the first datum 106 and a second datum, with conflicting information. Without limitation, when conflicting key datums 140, such as different pickup dates or locations, are detected in multiple emails, the validation model 150 may flag this inconsistency and generate an output 152 that prompts the customer for clarification. For instance, without limitation, the validation model 150 may produce a response stating, "It appears we have two different pickup dates for your order #12345. Could you please confirm the correct date?" Continuing, this step may prevent further processing until the discrepancy is resolved, ensuring accuracy in subsequent actions. Additionally and or alternatively, the validation model 150 may employ a "hold" status or initiate an escalation to support personnel if the conflict cannot be resolved automatically. Continuing, this may allow a support agent to review the situation manually and, if needed, directly contact the customer to clarify the information. Continuing, the validation model 150 may also reference historical data to suggest a likely choice based on past confirmed interactions, which may streamline the resolution process. Continuing, by prompting for clarification or deferring to customer support, the validation model 150 may reduce errors and maintain data integrity, ultimately enhancing the customer experience and ensuring that requests are processed accurately.

With continued reference to FIG. 1, the validation model 150 may include a natural language processor 154 configured to generate machine-generated text data 156 to a downstream device 158 within the downstream system 160. As used in this disclosure, "machine-generated text" is text produced by an artificial intelligence model or natural language processing system rather than by a human. In a non-limiting example, the machine-generated text data 156 may be created based on key datums 140 and/or structured outputs provided to the apparatus and may include responses, summaries, instructions, or other content tailored to a specified purpose. For example, without limitation, the validation model 150 may generate, using the natural language processor 154, machine-generated text data 156 as the output 152 which may include automatically crafted replies to common customer inquiries, such as order status updates or instructions on scheduling pickups.

With continued reference to FIG. 1, as used in this disclosure, "downstream device" is a device that accesses and interacts with apparatus 100. For instance, and without limitation, downstream device 158 may include a remote device and/or apparatus 100. In a non-limiting embodiment, downstream device 158 may be consistent with a computing device as described in the entirety of this disclosure. Without limitation, the downstream device 158 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through display. Additionally, or alternatively, processor 102 be connected to display device. In one or more embodiments, transmitting the output 152 may include displaying the output 152 at display device using a visual interface.

Still referring to FIG. 1, processor 102 is configured to transmit the output 152 to a downstream system 160. As used in this disclosure, a "downstream system" is any secondary system or process that receives data, actions, or outputs from an upstream source. In a non-limiting example, the apparatus may be the upstream device and APIs may be the downstream system 160. Without limitation, the APIs may use the output 152 from the apparatus as input to continue or complete a process. In a non-limiting example, the downstream system 160 may include a customer support interface, data storage systems, or automated response systems that interact with customers. The downstream system 160 processes or utilizes the machine-generated text data 156 and other outputs to fulfill specific business functions, such as sending a response back to the customer or updating records With continued reference to FIG. 1, the downstream system 160 may include one or more application programmable interfaces (APIs) 162. As used in this disclosure, an "application programming interface (API)" is a set of protocols, tools, and definitions that enables one software system to communicate and interact with another. Without limitation, an API 162 may allow different applications or devices to exchange data and commands, facilitating integration between systems by specifying how requests and responses should be formatted and handled. For instance, the API 162 may allow the apparatus to transmit machine-generated text data 156 or other outputs 152 directly to a customer relationship management (CRM) system. Continuing, through this API 162, the CRM may record interactions, update customer profiles, or log service requests based on the received data.

With continued reference to FIG. 1, the one or more APIs 162 may be deployed using a continuous integration and continuous delivery (CI/CD) pipeline. As used in this disclosure, a "CI/CD pipeline" is an automated framework that manages the processes of integrating, testing, and deploying code in software development. In a non-limiting example, the CI/CD pipeline may allow for frequent, reliable, and automated code updates by combining stages like code integration, automated testing, and deployment into a streamlined workflow. In a non-limiting example, CI/CD pipelines for the API 162 deployment may be established within a cs-ai-apis repository. Continuing, the process of deploying the APIs 162 may include creating multiple CI/CD pipelines. Without limitation, the CI/CD pipeline process may accelerate the software development lifecycle, reducing integration issues, and ensuring new code changes are consistently tested, validated, and ready for release.

Additionally and or alternatively, the API 162 may transmit outputs 152 to a ticketing system for customer support, where the machine-generated text data 156 may form an initial response or may triage requests, ensuring that customer inquiries are appropriately categorized and directed to the relevant support team. In another example, the API 162 may be connected to a data analytics platform, where output 152 data is aggregated and analyzed to track trends, customer satisfaction, or service efficiency.

With continued reference to FIG. 1, the apparatus is further configured to generate system feedback 164. As used in this disclosure, "system feedback" is information generated by the apparatus that reflects the operational status, performance, or outcomes of certain processes within the system. Without limitation, the system feedback 164 may be used to inform users, administrators, or other connected systems about the current state of the apparatus or to prompt adjustments in response to detected conditions or requirements. In a non-limiting example, the system feedback 164 may include performance metrics that help administrators or connected systems monitor the operational efficiency of the apparatus. For instance, without limitation, the apparatus may generate feedback indicating the average time taken to process the first datum 106, or a customer request, identify potential bottlenecks, and/or report the success rate of automated response generation. Continuing, this feedback may allow administrators to identify areas for optimization within the apparatus, enhancing its efficiency and responsiveness and ensuring a high standard of customer service. Continuing, by tracking these metrics, the system can continuously adapt and improve, supporting better overall performance.

With continued reference to FIG. 1, in an embodiment, system feedback 164 may be utilized by a human operator to make adjustments or updates to one or more models within the apparatus 100. For example, system feedback 164 may include performance data indicating potential areas for improvement, such as a slower processing speed or an increase in error rates for automated responses, and may use this information to refine model parameters, retrain the model with new or more diverse data, or adjust specific algorithms to better align with desired objectives. For example, if the system feedback 164 indicates a delay in responding to customer queries, a human operator may decide to modify model configurations, reallocate system resources, or incorporate additional data inputs to address the issue.

With continued reference to FIG. 1, in an embodiment, system feedback 164 may allow one or more models within the apparatus 100 to update themselves automatically through iterative processes, without requiring direct human intervention. Continuing, this approach leverages feedback loops that guide models in learning from their own performance outcomes. For instance, if a model detects a pattern of inaccuracies in its automated responses based on system feedback 164, it may autonomously adjust its internal parameters, update its training data, or refine its logic to improve accuracy and reduce errors.

With continued reference to FIG. 1, in another non-limiting example, the system feedback 164 may include user-generated feedback. As used herein, "user-generated feedback" is feedback that reflects customer satisfaction, perceptions of the effectiveness of the apparatus, and suggestions for improvement. Without limitation, system feedback 164 may be gathered through prompts that ask users questions such as, "Did the apparatus resolve your issue?" or "What could be improved next time?" Continuing, the feedback may allow users to provide direct input on the performance of the apparatus, which may then be utilized to make iterative improvements to the functionality of the apparatus. In a non-limiting example, after a customer interacts using the first datum 106 with the apparatus for assistance-such as obtaining information about a shipment or receiving automated troubleshooting support—the apparatus may prompt the customer to rate their experience or indicate whether the apparatus fully addressed their needs. Continuing, the system feedback 164 may be logged as system feedback metrics, with satisfaction ratings and open-ended comments being analyzed to identify trends or common areas for improvement. Continuing, this type of user-generated system feedback may enable the apparatus to adapt based on real-world experiences, continuously refining its responses, workflows, or service processes to better meet user expectations. Without limitation, by systematically collecting and analyzing system feedback 164, administrators can guide targeted updates, enhancing the efficiency, effectiveness, and overall user satisfaction of the apparatus over time.

With continued reference to FIG. 1, the validation model 150 may be trained using the system feedback 164 and validation training data 166 comprising historical output 168 corresponding to historical attribute datums 170 associated with historical key datums 172. As used in this disclosure, "validation training data" is a dataset composed of historical data points used to train the validation model 150. Without limitation, the validation training data 166 may help the validation model 150 learn patterns in associating historical attribute datums 170 with appropriate responses or historical output 168. Continuing, by using real-world examples from past interactions, the validation training data 166 may provide a foundation for the validation model 150 to understand how to handle different inputs and generate accurate responses.

With continued reference to FIG. 1, as used in this disclosure, "historical output" is previously generated outputs 152 from the validation model 150. For example, the historical output 168 may include responses, actions, or decisions made by the validation model 150 in relation to past customer requests. Continuing, the historical output 168 may serve as examples for training, demonstrating how the apparatus handled prior situations. Without limitation, the historical output 168 may help guide the validation model 150 in understanding expected responses for similar future inputs. As used in this disclosure, "historical attribute datums" are specific pieces of information from past interactions that represent the key attributes or characteristics of earlier requests or data points processed by the apparatus. For example, without limitation, historical attribute datums 170 may include the type of request (e.g., "refund," "pickup scheduling") or priority level of a past inquiry. Continuing, the historical attribute datums 170 may provide context for the validation model 150 to recognize common patterns and respond accurately when similar datums are encountered in the future. As used in this disclosure, "historical key datums" are specific data points that were identified and extracted from prior inputs during past interactions within the apparatus. Without limitation, the historical key datums 172 may include essential information required to process earlier requests or actions, such as "pickup location," "order number," or "customer ID," based on the type of request or the attribute datum.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
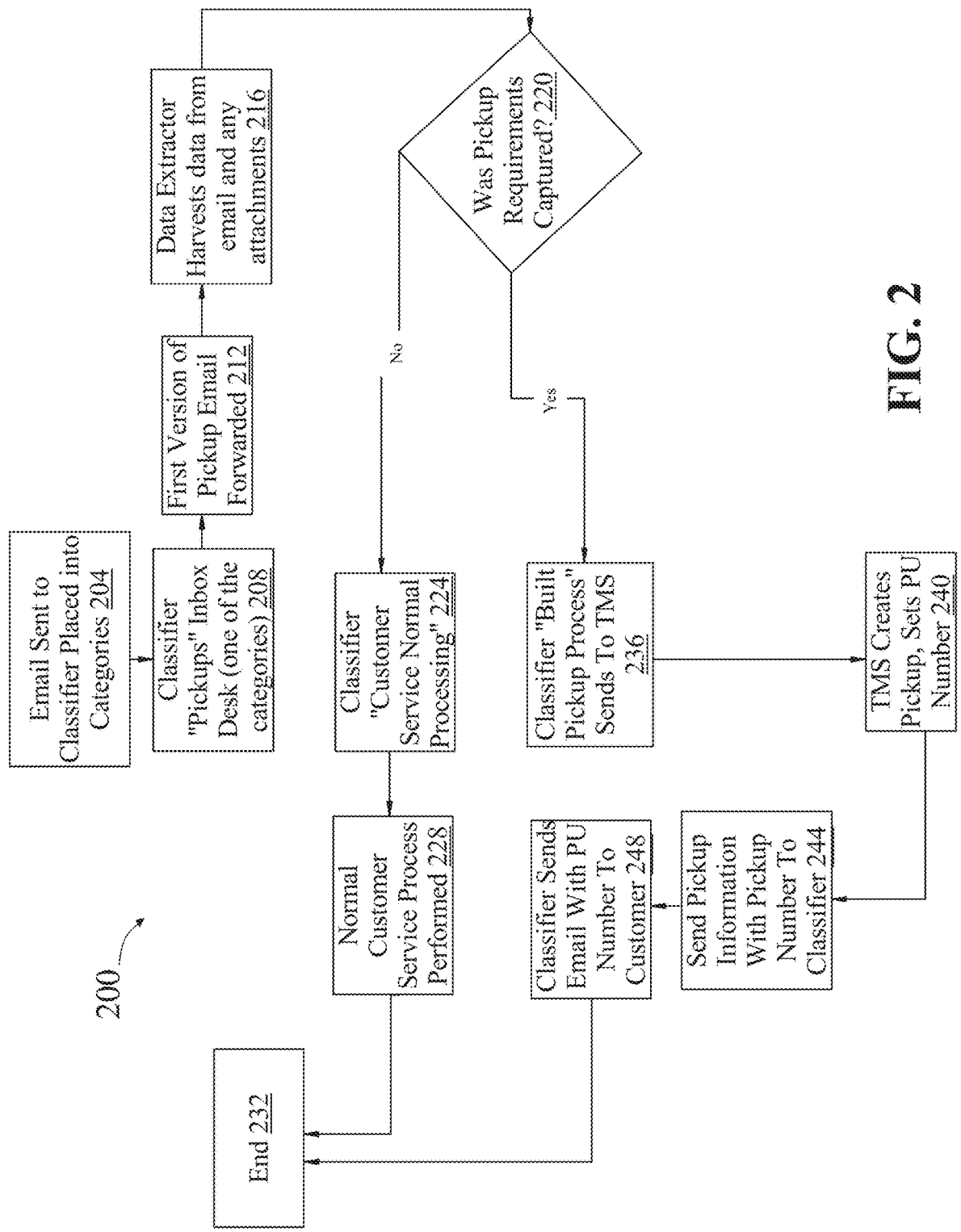
FIG. 2 is an exemplary illustration of a high level process flow.

Referring now to FIG. 2, an exemplary illustration 200 of a high level process flow. In an embodiment, the illustration 200 includes an email sent to classifier placed into categories 204. In an embodiment, the classifier may include TO. As used in this disclosure, "TO" refers to ThinkOwl, a software platform, or alternatively, a classifier. Without limitation, the classifier may be responsible for categorizing incoming emails or communications, such as placing them into designated categories for further processing within the system. Continuing, this classification function may allow automated sorting, routing, and handling of information, ensuring that emails related to pickups, customer service, and other tasks. In an embodiment, the illustration 200 includes classifier "pickups" inbox desk (one of the categories) 208. In an embodiment, the illustration 200 includes a first version of pickup email forwarded 212. In an embodiment, the illustration 200 includes data extractor harvests data from email and any attachments 216. In an embodiment, the illustration 200 includes was pickup requirements captured 220. In an embodiment, the illustration 200 includes classifier "Customer service normal processing" 224 if the answer to the previous question is "No." In an embodiment, the illustration 200 depicts normal customer service process performed 228. In an embodiment, the illustration 200 includes end 232.

In another non-limiting example, the illustration 200 includes classifier "Built Pickup Process" sends to TMS 236 if the answer to the was pickup requirements captured 220 is "Yes." As used in this disclosure, a "TMS" is a Transportation Management System. Continuing, the TMS may include software used to plan, execute, and/or optimize the movement of goods, ensuring efficient logistics and delivery. Without limitation, the TMS may be responsible for creating a pickup entry and assigning a unique pickup identifier (PU number). In an embodiment, the illustration 200 depicts TMS creates pickup, sets PU number 240. As used in this disclosure, a "PU" is a Pickup (PU) Number. In a non-limiting example, the PU is a unique identifier assigned by the TMS to track specific pickup requests and/or scheduled pickups. Without limitation, the PU number may be communicated to the relevant parties (e.g., the customer), allowing them to reference the pickup in future communications or status inquiries. In an embodiment, the illustration 200 includes send pickup information with pickup number to classifier 244. In an embodiment, the illustration 200 includes classifier sends email with PU number to customer 248. In an embodiment, the illustration 200 includes end 232.

Figure 3:
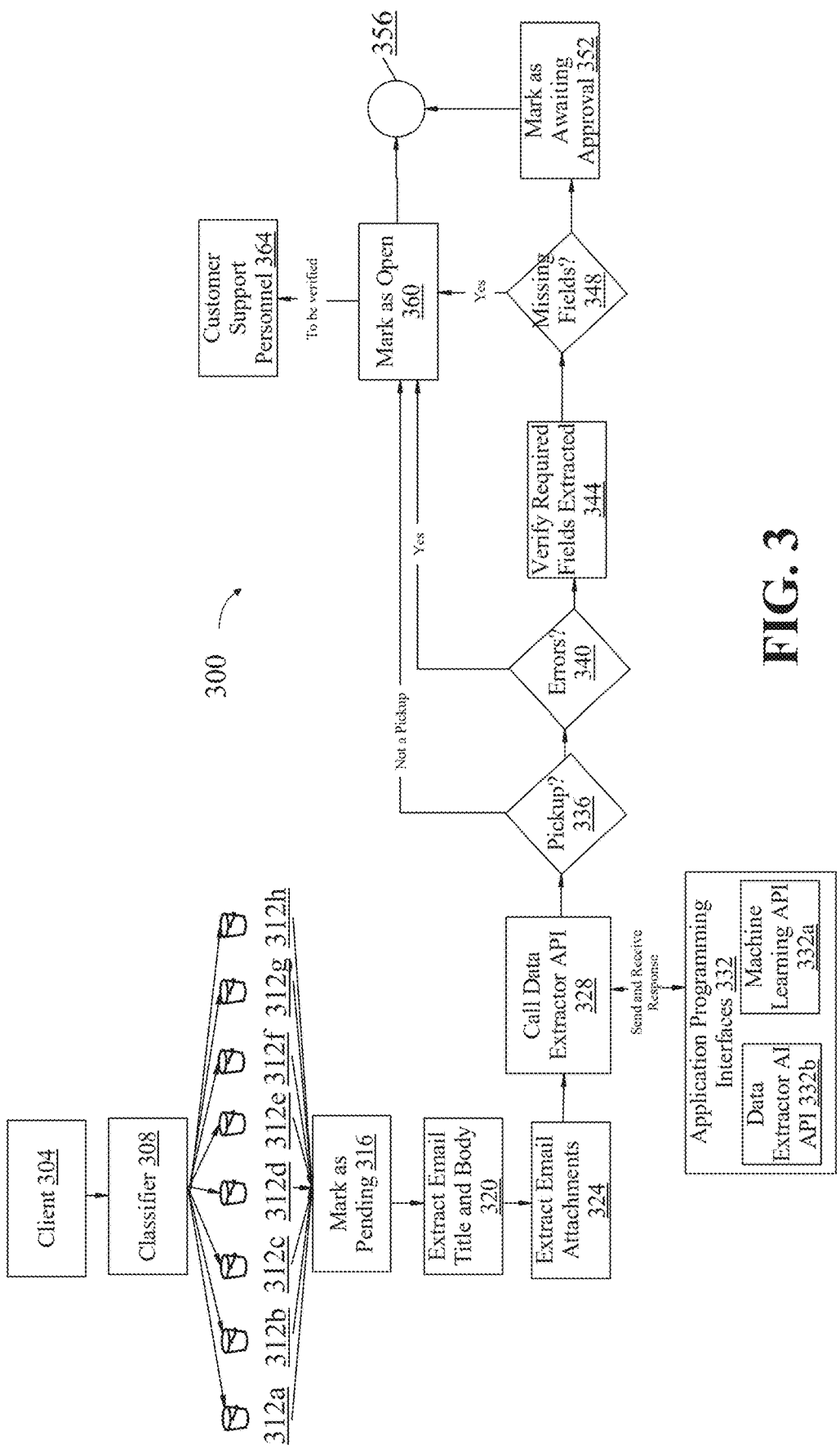
FIG. 3 is an exemplary illustration of an integration of a first scenario with a classifier.

Referring now to FIG. 3, an exemplary illustration 300 of an integration of a first scenario with a classifier. In an embodiment, the illustration 300 includes a client email 304. In an embodiment, the client email 304 may include first datum as previously defined herein. In an embodiment, the illustration 300 includes a classifier 308. In an embodiment, the classifier 308 classifies the client email 304 into one or more classification buckets 312a-h. In an embodiment, once classified into the classification bucket 312a-h, the client email 304 is marked as pending 316. In an embodiment, once marked as pending 316, the system may extract email title and body 320. In an embodiment, once the system extracts the email title and body 320, the system may extract email attachments 324. In an embodiment, once the system extracts the email attachments 324, the system may call data extractor API 328. In an embodiment, calling data extractor API 328 may include sending and receiving responses from APIs 332 including machine learning API 332a and/or data extractor AI API 332b. Without limitation, the "machine learning API" may include a cloud-based platform that utilizes natural language processing, large language models, and/or other generative AI capabilities to process, analyze, and generate text-based data. Without limitation, the machine learning API 332a may process unstructured or structured data by leveraging advanced AI techniques, facilitating tasks such as data extraction, text classification, summarization, and other forms of automated language analysis and generation. In an embodiment, once calling data extractor API 328 receives responses from APIs 332, the system may determine whether a pickup is required 336. In an embodiment, if a pickup 336 is required, the system may determine whether there are errors 340. In an embodiment, if there are no errors 340, the system may verify required fields extracted 344. Without limitation, errors 340 may include typos, grammatical issues, attachment downloading issues, attachment reading issues, unrecognized characters or symbols, and the like. In an embodiment, once the system verifies required fields extracted 344, the system may determine if there are missing fields 348. In an embodiment if there are no missing fields 348, the system may mark as awaiting approval 352. In an embodiment, if no pickup is required 336, if there are errors 340, and if there are missing fields 348, then the system may mark as open 360. In an embodiment, if the system marks as open 360 the system may submit the client email 304 to a customer support personnel 364 to be verified. In an embodiment, the final step of the process may include generating one or more output termination actions 356. In an embodiment, the one or more output termination actions 356 may involve sending an email to the customer with the pickup information at the end of the cycle or alternatively routing the pickup information to customer service, which would then communicate it to the customer. In an embodiment, the one or more output termination actions 356 may accommodate any suitable action that fulfills the completion criteria, adapting to specific operational needs or preferences to ensure efficient communication and resolution. In a non-limiting example, the one or more output termination actions 356 may include generating a confirmation message that is sent to the customer via text message, updating a customer portal with the pickup details so the customer can access the information directly, or triggering an automated phone call that conveys the necessary pickup information. Alternatively, the one or more output termination actions 356 may involve sending a report to an internal team for manual verification before any customer communication, or even queuing the data for a scheduled batch update to external systems.

Figure 4:
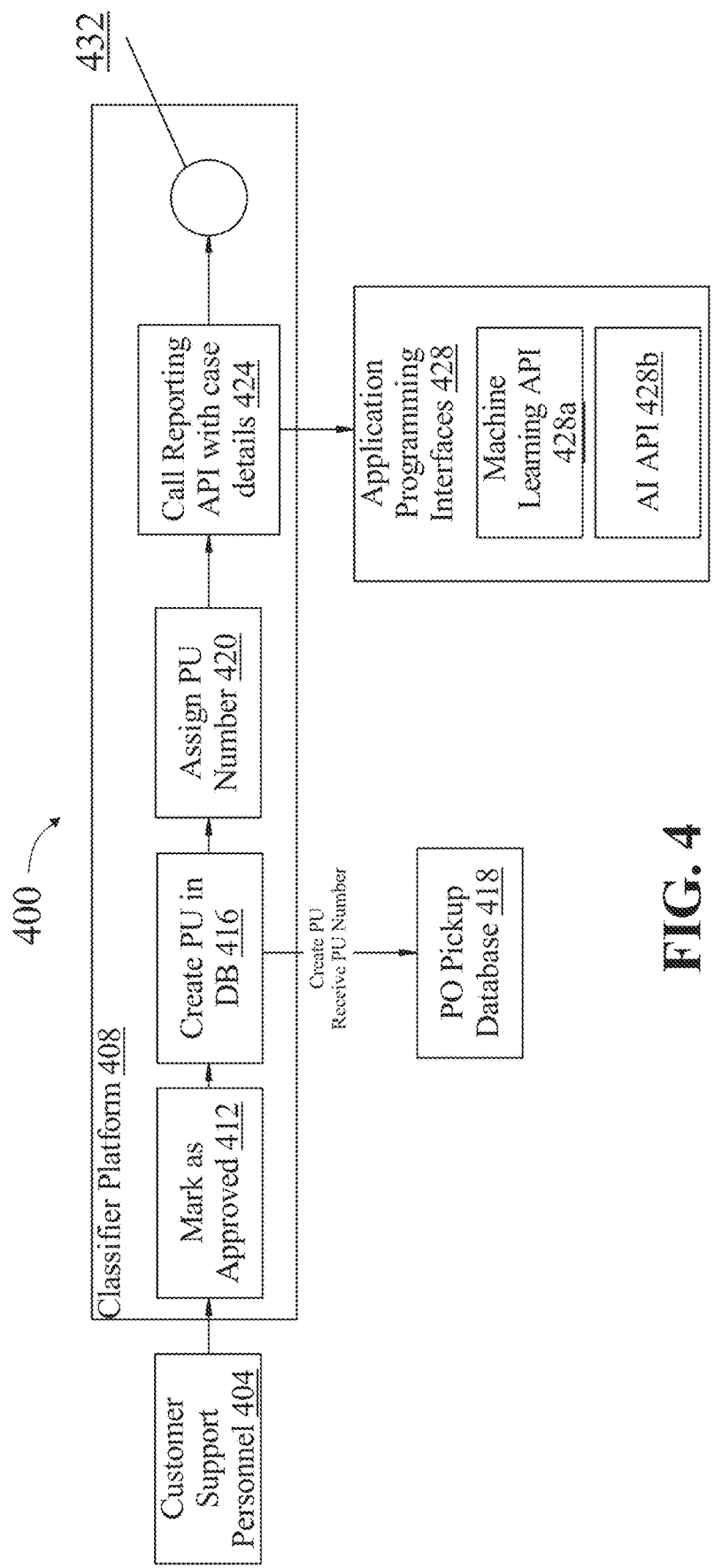
FIG. 4 is an exemplary illustration of an integration of a second scenario with a classifier.

Referring now to FIG. 4, an exemplary illustration 400 of an integration of a second scenario with a classifier. In an embodiment, the illustration 400 includes a customer support personnel 404. In an embodiment, the customer support personnel 404 may interact with the classifier platform 408. In an embodiment, the classifier platform 408 may include mark as approved 412. In an embodiment, the classifier platform 408 may include create PU number in database 416. In an embodiment, the created PU number in database 416 may be stored in the PO pickup database. In an embodiment, the classifier platform 408 may include assigning PU number 420. In an embodiment, the classifier platform 408 may include call the reporting API with case details 424. In an embodiment, the call the reporting API with case details 424 may include interacting with APIs 428. In an embodiment, the APIs 428 may include machine learning API 428*a* and/or the AI API 428*b*. In an embodiment, the classifier platform 408 final step may include generating one or more output termination actions 432. In an embodiment, the one or more output termination actions 432 may involve sending an email to the customer with the pickup information at the end of the cycle or alternatively routing the pickup information to customer service, which would then communicate it to the customer. In an embodiment, the one or more output termination actions 432 may accommodate any suitable action that fulfills the completion criteria, adapting to specific operational needs or preferences to ensure efficient communication and resolution. In a non-limiting example, the one or more output termination actions 432 may include generating a confirmation message that is sent to the customer via text message, updating a customer portal with the pickup details so the customer can access the information directly, or triggering an automated phone call that conveys the necessary pickup information. Alternatively, the one or more output termination actions 432 may involve sending a report to an internal team for manual verification before any customer communication, or even queuing the data for a scheduled batch update to external systems.

Figure 5:
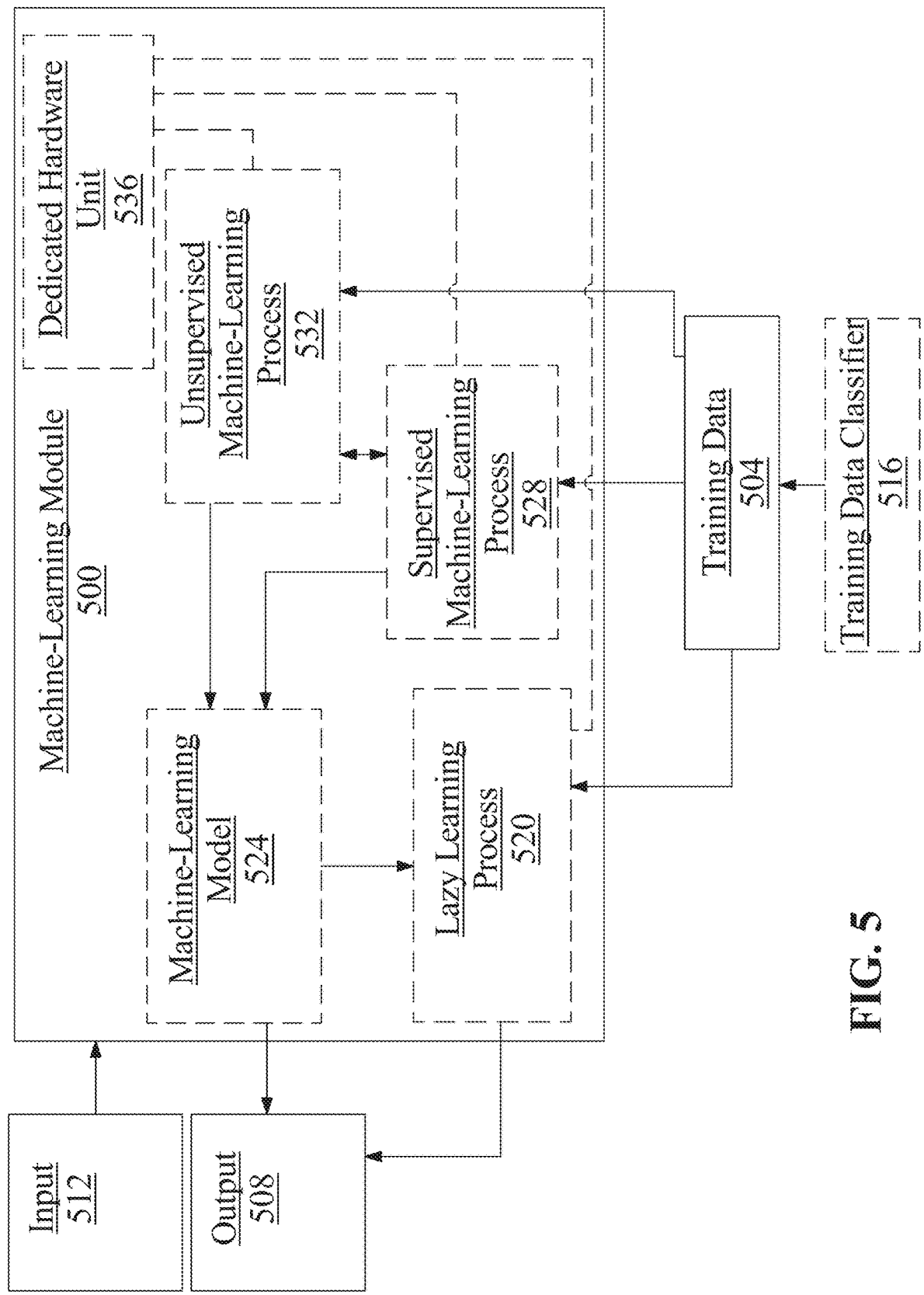
FIG. 5 is a block diagram of an exemplary machine-learning process.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example inputs may include first datum, unstructured data and outputs may include key datums and structured output.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to categories of types of request.

Still referring to FIG. 5, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 5, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 5, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 5, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new}=\frac{X-X_{min}}{X_{max}-X_{min}}.$$

Feature scaling may include mean normalization, which involves use of a mean value of a set and/or subset of values, $X_{mean}$ with maximum and minimum values:

$$X_{new}=\frac{X-X_{mean}}{X_{max}-X_{min}}.$$

Feature scaling may include standardization, where a difference between X and $X_{mean}$ is divided by a standard deviation σ of a set or subset of values:

$$X_{new}=\frac{X-X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new}=\frac{X-X_{median}}{IQR}.$$

Persons skilled in the art, upon reviewing the entirety of this disclosure, will be aware of various alternative or additional approaches that may be used for feature scaling.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include [input examples] as described above as inputs, [output examples] as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
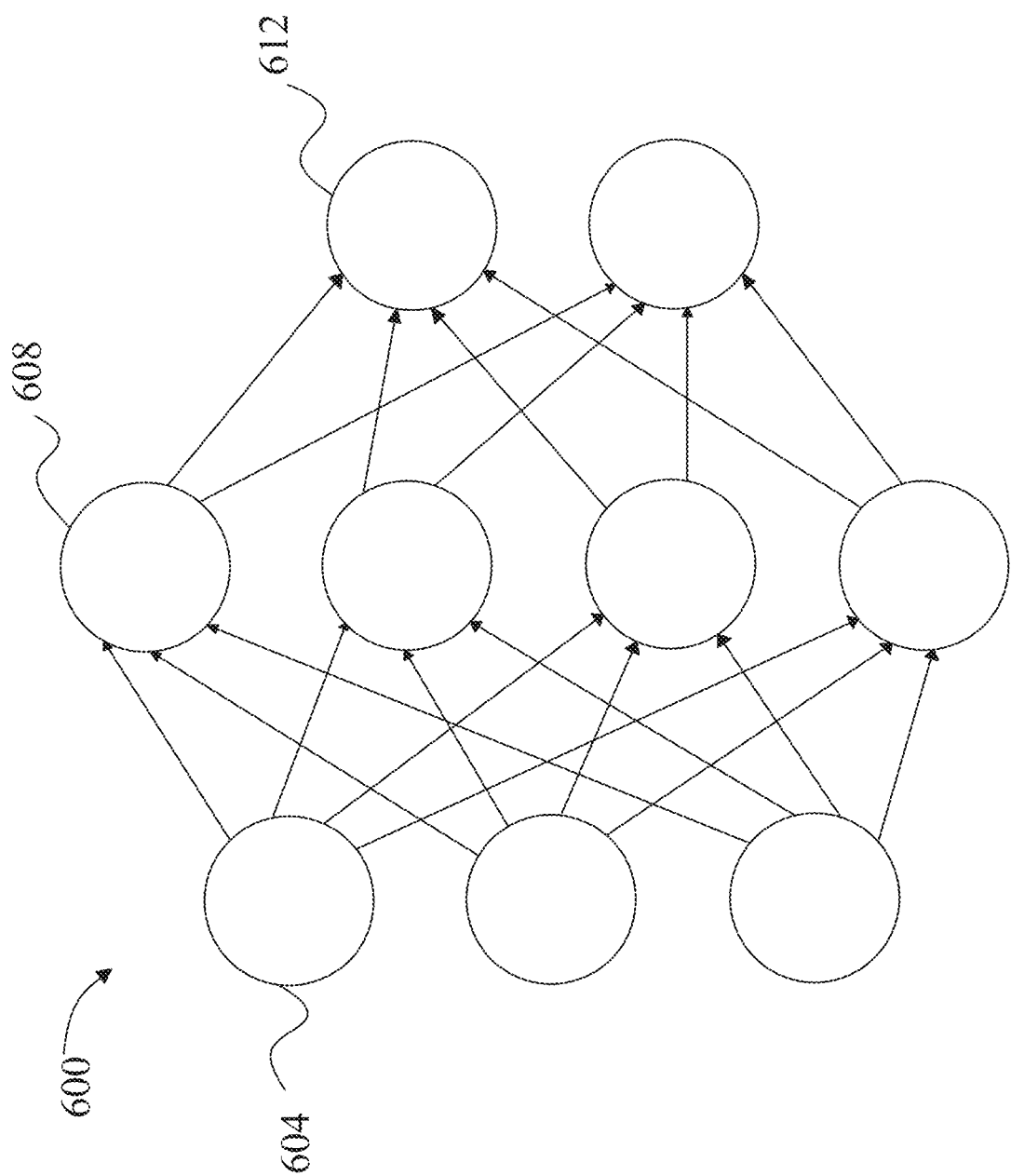
FIG. 6 is a diagram of an exemplary embodiment of a neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
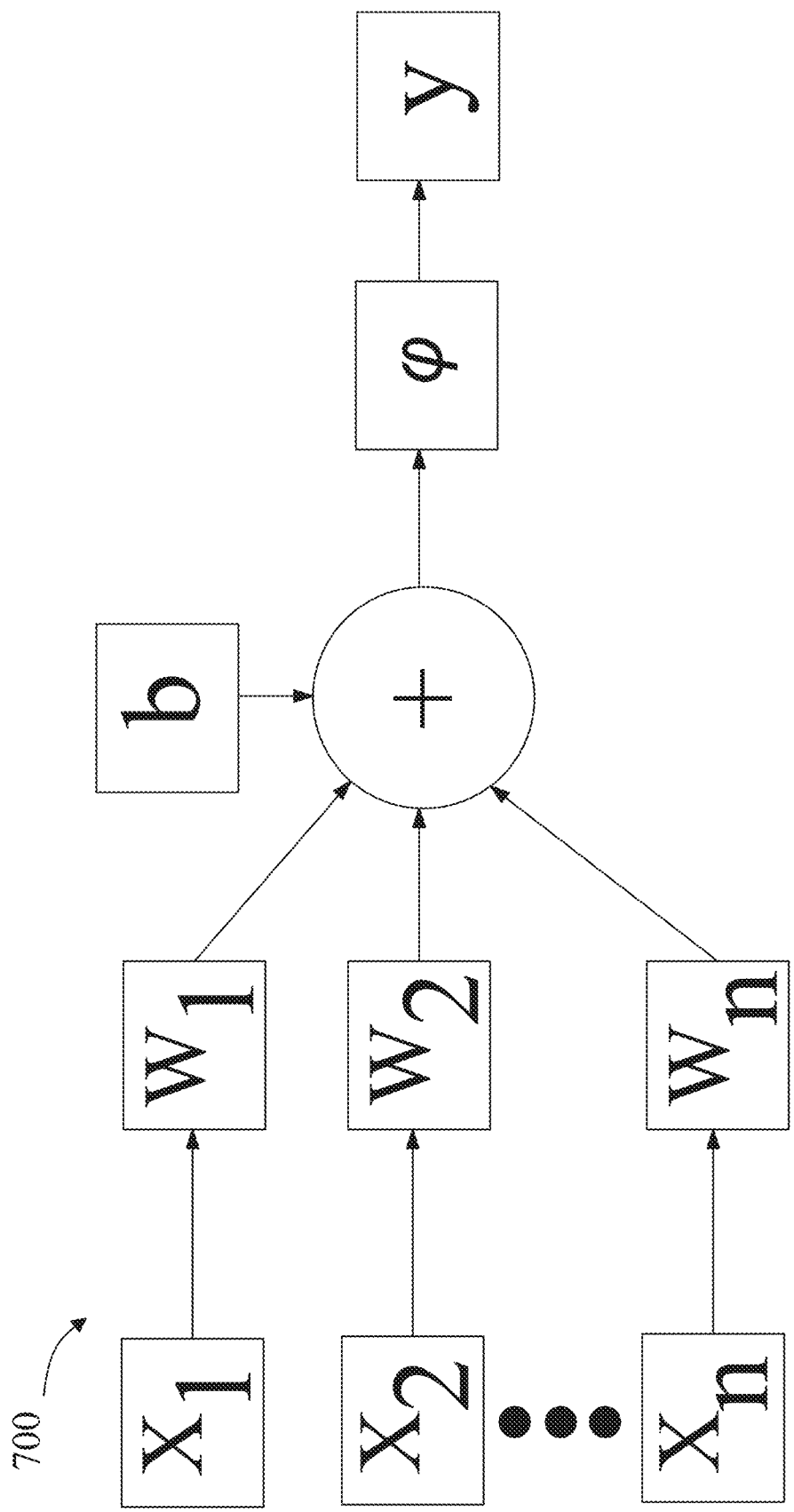
FIG. 7 is a diagram of an exemplary embodiment of a node of a neural network.

Referring now to FIG. 7, an exemplary embodiment of a node 700 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid (x), a Gaussian error linear unit function such as f(x)=a(1+tanh($\sqrt{2/\pi}$(x+bx$^r$))) for some values of a, b, and r, and/or a scaled exponential linear unit function such as $$f(x) = \lambda \begin{cases} \alpha(e^x - 1) \text{ for } x < 0 \\ x \text{ for } \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
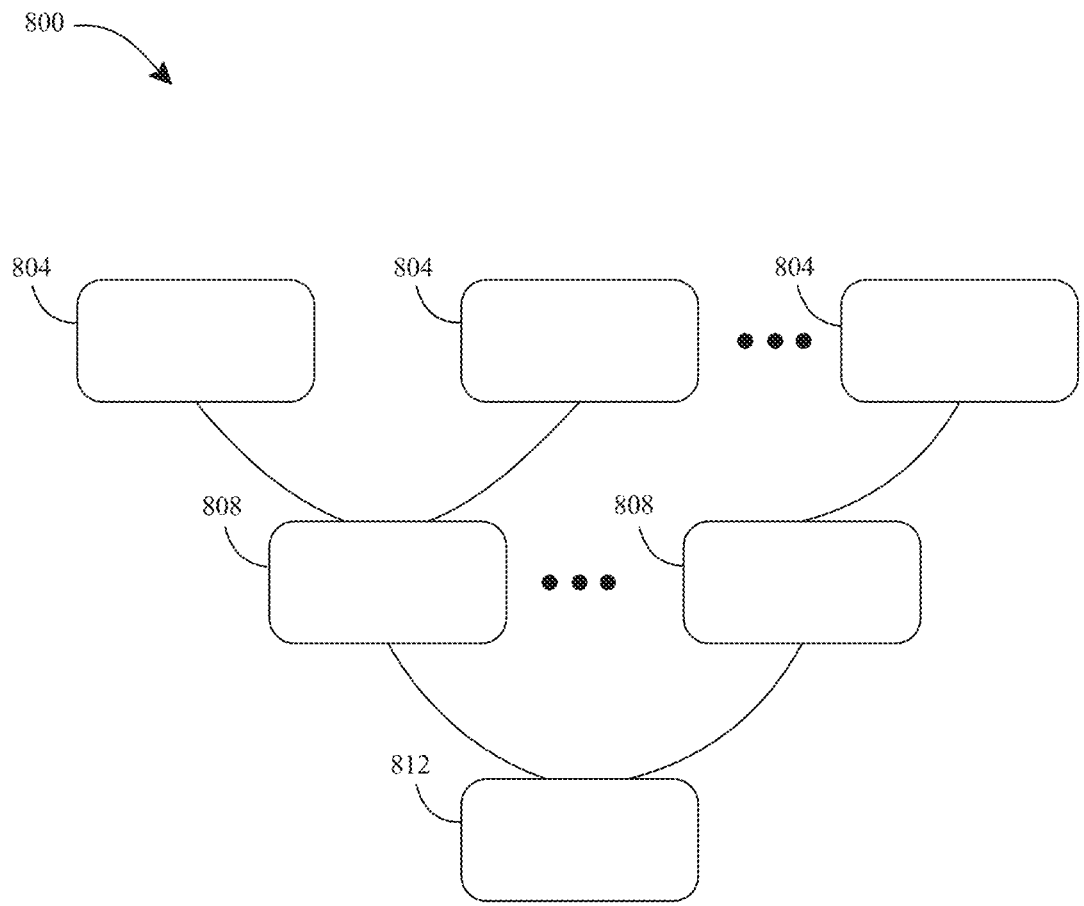
FIG. 8 is an exemplary embodiment of a cryptographic accumulator.

Referring now to FIG. 8, an exemplary embodiment of a cryptographic accumulator 800 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or non-membership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 800 has a plurality of accumulated elements 804, each accumulated element 804 generated from a lot of the plurality of data lots. Accumulated elements 804 are create using an encryption process, defined for this purpose as a process that renders the lots of data unintelligible from the accumulated elements 804; this may be a one-way process such as a cryptographic hashing process and/or a reversible process such as encryption. Cryptographic accumulator 800 further includes structures and/or processes for conversion of accumulated elements 804 to root 812 element. For instance, and as illustrated for exemplary purposes in FIG. 8, cryptographic accumulator 800 may be implemented as a Merkle tree and/or hash tree, in which each accumulated element 804 created by cryptographically hashing a lot of data. Two or more accumulated elements 804 may be hashed together in a further cryptographic hashing process to produce a node 808 element; a plurality of node 808 elements may be hashed together to form parent nodes 808, and ultimately a set of nodes 808 may be combined and cryptographically hashed to form root 812. Contents of root 812 may thus be determined by contents of nodes 808 used to generate root 812, and consequently by contents of accumulated elements 804, which are determined by contents of lots used to generate accumulated elements 804. As a result of collision resistance and avalanche effects of hashing algorithms, any change in any lot, accumulated element 804, and/or node 808 is virtually certain to cause a change in root 812; thus, it may be computationally infeasible to modify any element of Merkle and/or hash tree without the modification being detectable as generating a different root 812. In an embodiment, any accumulated element 804 and/or all intervening nodes 808 between accumulated element 804 and root 812 may be made available without revealing anything about a lot of data used to generate accumulated element 804; lot of data may be kept secret and/or demonstrated with a secure proof as described below, preventing any unauthorized party from acquiring data in lot.

Alternatively or additionally, and still referring to FIG. 8, cryptographic accumulator 800 may include a "vector commitment" which may act as an accumulator in which an order of elements in set is preserved in its root 812 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 800 that may be used as described herein. In addition to Merkle trees, accumulators may include, without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function, but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 9:
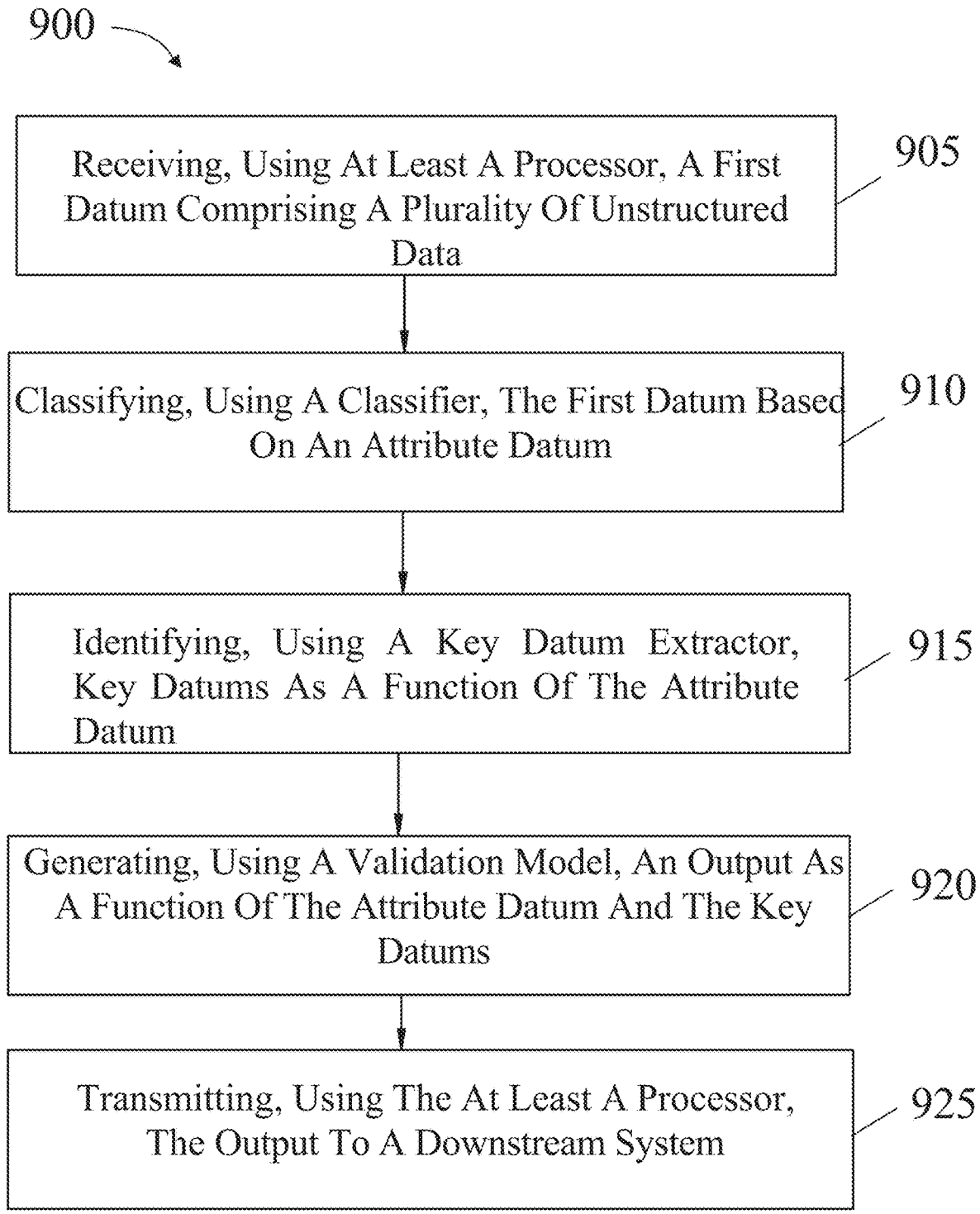
FIG. 9 is a block diagram of an exemplary method for generating an automated output as a function of an attribute datum and key datums.

Referring now to FIG. 9, a flow diagram of an exemplary method 900 for generating an automated output as a function of an attribute datum and key datums is illustrated. At step 905, method 900 includes receiving, using at least a processor, a first datum comprising a plurality of unstructured data. This may be implemented as described and with reference to FIGS. 1-8.

Still referring to FIG. 9, at step 910, method 900 includes classifying, using a classifier, the first datum based on an attribute datum. This may be implemented as described and with reference to FIGS. 1-8.

Still referring to FIG. 9, at step 915, method 900 includes identifying, using a key datum extractor, key datums as a function of the attribute datum. This may be implemented as described and with reference to FIGS. 1-8.

Still referring to FIG. 9, at step 920, method 900 includes generating, using a validation model, an output as a function of the attribute datum and the key datums. This may be implemented as described and with reference to FIGS. 1-8.

Still referring to FIG. 9, at step 925, method 900 includes transmitting, using the at least a processor, the output to a downstream system. This may be implemented as described and with reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
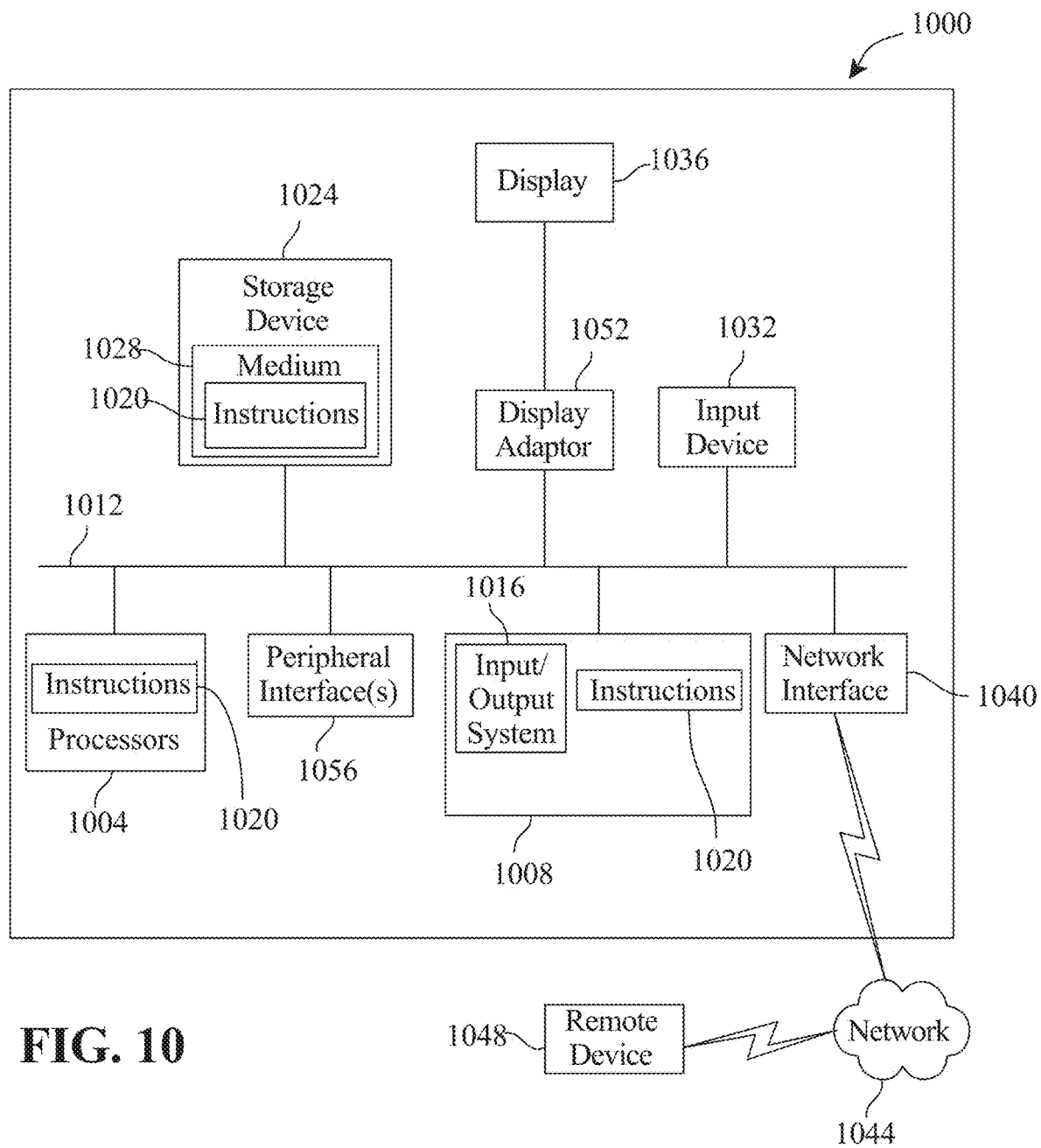
FIG. 10 is a block diagram of a computing system that can be used to implement any one or more of the methodologies disclosed herein and any one or more portions thereof.

FIG. 10 shows a diagrammatic representation of one embodiment of computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display device 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating an automated output as a function of an attribute datum and key datums, wherein the apparatus comprises:
 at least a computing device, wherein the computing device comprises:
 a memory; and
 at least a processor communicatively connected to the memory, wherein the memory contains instructions configuring the at least a processor to:
 receive a first datum comprising a plurality of unstructured data, wherein the plurality of unstructured data is processed using a multimodal generative model configured to extract target data to output a plurality of structured data, wherein the multimodal generative model is configured to identify one or more gaps in the plurality of unstructured data and fill the one or more gaps in the plurality of unstructured data with prediction data, and wherein the prediction data comprises a forecast derived from the attribute datum;
 classify, using a classifier, the first datum based on the attribute datum;
 identify, using a key datum extractor, key datums as a function of the attribute datum;
 generate, using a validation model, an output as a function of the attribute datum and the key datums;
 transmit the output to a downstream system.

2. The apparatus of claim 1, wherein plurality of unstructured data comprises one or more of text data and an auxiliary data object.

3. The apparatus of claim 1, wherein the multimodal generative model is trained on multimodal training data comprising a plurality of historical unstructured data corresponding to a plurality of historical structured data.

4. The apparatus of claim 1, wherein the key datum extractor comprises a structured output model configured to generate a structured output comprising at least a JavaScript Object Notation.

5. The apparatus of claim 1, wherein the validation model comprises a natural language processor configured to generate machine-generated text data to a downstream device within the downstream system.

6. The apparatus of claim 1, wherein the apparatus is further configured to generate system feedback.

7. The apparatus of claim 6, wherein the validation model is trained using the system feedback and validation training data comprising historical output corresponding to historical attribute datums associated with historical key datums.

8. The apparatus of claim 1, wherein the downstream system comprises one or more application programmable interfaces.

9. A method for generating an automated output as a function of an attribute datum and key datums, wherein the method comprises:
  receiving, using at least a processor, a first datum comprising a plurality of unstructured data, wherein the plurality of unstructured data is processed using a multimodal generative model configured to extract target data to output a plurality of structured data, wherein the multimodal generative model is configured to identify one or more gaps in the plurality of unstructured data and fill the one or more gaps in the plurality of unstructured data with prediction data, and wherein the prediction data comprises a forecast derived from the attribute datum;
  classifying, using a classifier, the first datum based on the attribute datum;
  identifying, using a key datum extractor, key datums as a function of the attribute datum;
  generating, using a validation model, an output as a function of the attribute datum and the key datums;
  transmitting, using the at least a processor, the output to a downstream system.

10. The method of claim 9, wherein plurality of unstructured data comprises one or more of text data and an auxiliary data object.

11. The method of claim 9, further comprising training the multimodal generative model on multimodal training data comprising a plurality of historical unstructured data corresponding to a plurality of historical structured data.

12. The method of claim 9, wherein the key datum extractor comprises a structured output model configured to generate a structured output comprising at least a JavaScript Object Notation.

13. The method of claim 9, wherein the validation model comprises a natural language processor configured to generate machine-generated text data to a downstream device within the downstream system.

14. The method of claim 9, further configured to generate system feedback.

15. The method of claim 14, wherein the validation model is trained using the system feedback and validation training data comprising historical output corresponding to historical attribute datums associated with historical key datums.

16. The method of claim 9, wherein the downstream system comprises one or more application programmable interfaces.

* * * * *